United States Patent [19]

Kutnyak et al.

[11] Patent Number: 4,479,835

[45] Date of Patent: Oct. 30, 1984

[54] APPARATUS AND METHOD FOR FORMING WIRE REINFORCED HELICALLY FABRICATED TUBING

[75] Inventors: Thomas A. Kutnyak, Greenwood; Arthur R. Campbell, Abbeville, both of S.C.

[73] Assignee: Automation Industries, Inc., Greenwich, Conn.

[21] Appl. No.: 384,012

[22] Filed: Jun. 1, 1982

[51] Int. Cl.³ .......................................... B65H 81/00
[52] U.S. Cl. .................................... 156/143; 156/429
[58] Field of Search ............. 156/143, 144, 429, 195, 156/433; 493/299, 282, 301; 228/145; 72/48, 142

[56] References Cited

U.S. PATENT DOCUMENTS

| | | | |
|---|---|---|---|
| 2,731,070 | 1/1956 | Meissner | 156/143 |
| 3,243,328 | 3/1966 | Britton et al. | 156/195 |
| 3,846,202 | 11/1974 | Clarke | 156/195 |
| 3,890,181 | 6/1975 | Stent et al. | 156/143 |
| 3,897,297 | 7/1975 | Perusse et al. | 156/429 |
| 3,962,019 | 6/1976 | Rejeski | 156/143 |
| 3,979,818 | 9/1976 | Groch et al. | 156/195 |

Primary Examiner—Michael Ball
Attorney, Agent, or Firm—Francis N. Carten

[57] ABSTRACT

In the forming of flexible tubing of at least one wire helix covered by a helically wrapped tape, an apparatus and method for making such tubing wherein an endless belt of a width a plurality of times the pitch of the wire helix is passed against a rotating mandrel surface to draw the wire helix and tape wrapping together.

2 Claims, 5 Drawing Figures

APPARATUS AND METHOD FOR FORMING WIRE REINFORCED HELICALLY FABRICATED TUBING

BACKGROUND OF THE INVENTION

It has long been known in the prior art to manufacture flexible tubing continuously of a wire helix covered by helically wrapped tape U.S. Pat. No. 2,486,387 is an early example of such apparatus wherein a grooved cantilevered mandrel turns against a similarly grooved press roller to draw the helically fabricated components together. In U.S. Pat. Nos. 2,539,853, 3,219,733 and 3,336,172, that general concept is also employed but with two or more outside guiding rollers acting upon the exterior of the helically fabricated tubing as it emerges continuously from the mandrel. In U.S. Pat. No. 2,539,853 the mandrel is made somewhat yielding by means of an inner rubber core.

It is the principal purpose of this invention to improve upon such prior art methods and machines so that the continuously helically fabricated product may be made at higher production speeds and with greater possible variations in the helix pitch, lead angle and diameter. These objects are accomplished by departing from the prior art concept of a relatively short grooved mandrel cooperating with a press roll of similar length. The helical components are drawn together in conventional apparatus of that type at a relatively confined longitudinal section of the product on the mandrel so that the wrapping forces are exerted on the tape and wire in a rather concentrated area. This can damage the components if production speeds are too high. In accordance with the present invention as set forth herein the wrapping forces are distributed evenly over a considerably larger longitudinal section of the product without the use of a press roller.

SUMMARY OF THE INVENTION

The invention provides apparatus for continuously forming flexible tubing of at least one wire helix of a certain pitch and lead angle covered by helically wrapped tape. The mandrel is rotatable about a longitudinal axis. An endless belt is provided of a width a plurality of times the pitch of the wire helix and having a run passing in contact with the mandrel. There are supplies of the wire and the tape, and wire forming means are provided for wrapping the tape about the wire helix with adjoining tape convolutions overlapped together. In a preferred form of the apparatus the direction of drive of the belt is at an angle to the mandrel axis equal to the helix lead angle.

The invention also provides a method of making flexible tubing of at least one wire helix of a certain pitch and lead angle covered by helically wrapped tape. A cylindrical mandrel surface is axially rotated and against that surface a run of an endless belt is passed of a width a plurality of times the wire helix pitch. The wire helix is drawn between the mandrel and the run of the belt. The tape is also drawn between the mandrel and the run of the belt so that it is wrapped about the helix with overlapping turns. The overlapping turns of the tape are then adhered together. In a preferred form of the method the run of the endless belt has a direction of travel at an angle to the rotation axis of the mandrel surface equal to the helix lead angle.

DESCRIPTION OF PREFERRED EMBODIMENT

In accordance with the method and apparatus of the invention a continuous length of flexible tubing may be produced by forming a continuous length of wire into a helix about which a continuous length of tape is wound in overlapping relation. The wire serving as a reinforcement element in this product need not be of metal or of any particular cross-section though a wire of circular cross-section is typically employed. As used herein the term "wire" is intended to include all equivalent elongated elements whether of metal or non-metallic material, or unitary or composite construction, which is suitable as a reinforcing helix. Also the term "tape" is intended to include strips of various wall materials whether plastic or non-plastic and again of unitary or composite construction, adapted to be wrapped about the helix in various plies or overlapping turns to form the wall of the flexible tubing product.

Figure 1:
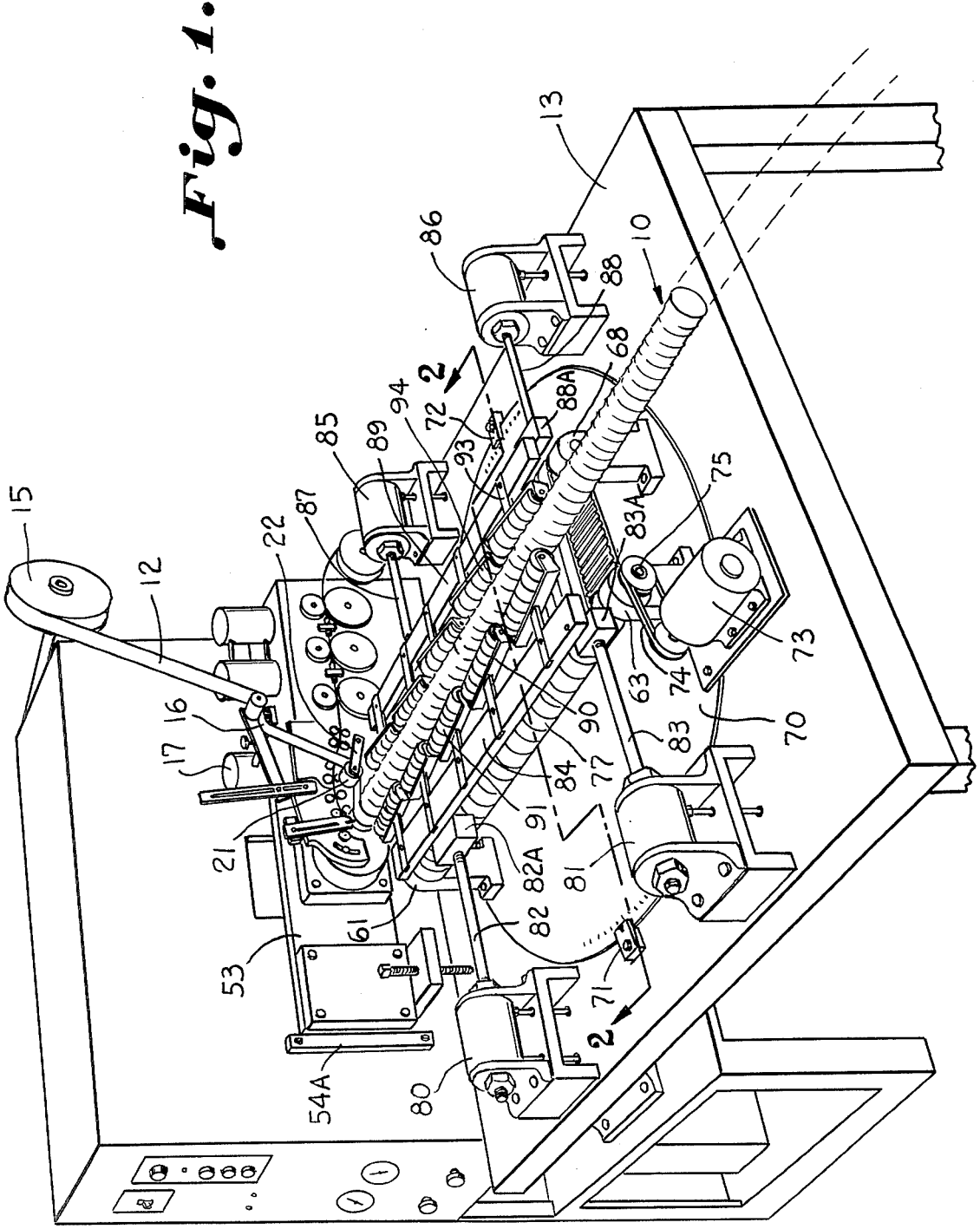
FIG. 1 is a perspective view of the apparatus of the invention.

In FIG. 1 a typical product of flexible tubing 10 is shown emerging from the apparatus of the invention in indefinite lengths. For purposes of describing the preferred embodiment of the method and apparatus of the invention, this product is illustrated in its simplest form comprising a wire 11 visible in all of the figures and a single plastic tape 12 helically wrapped about the tape 12 with overlapping turns. It is within the scope of the invention to vary these basic elements of the product both in form and in number in accordance with designs well known in the art.

The apparatus comprises a frame 13 supporting all of the components and stations and requiring only an external electrical power source for its operation. At one end of the apparatus which can be termed the rear thereof is a control box 14 in which is contained electrical circuitry and related means for varying the different speeds and drives. This circuitry is not itself part of the invention and hence is not illustrated or described in detail.

Supported at the rear of the machine on the frame 13 is a spool 15 holding an indefinite length of the tape 12. The tape 12 is drawn from the spool 15 beneath a glue-soaked pad 16 supplied with flowable glue from a reservoir 17 shown in FIGS. 1 and 2. In passing over the pad 16 the tape 12 receives a continuous deposit of glue which will result in each overlapping convolution of the tape adhering one to the other. The glue pad 16 and tank 17 are supported on first and second adjustable brackets 18 and 19 which allow the path of travel of the tape to be varied depending upon the diameter of the finished tubing 10 and other parameters. A set screw 20 between these brackets 18 and 19 allows them to be fixed in the position desired.

Figure 5:
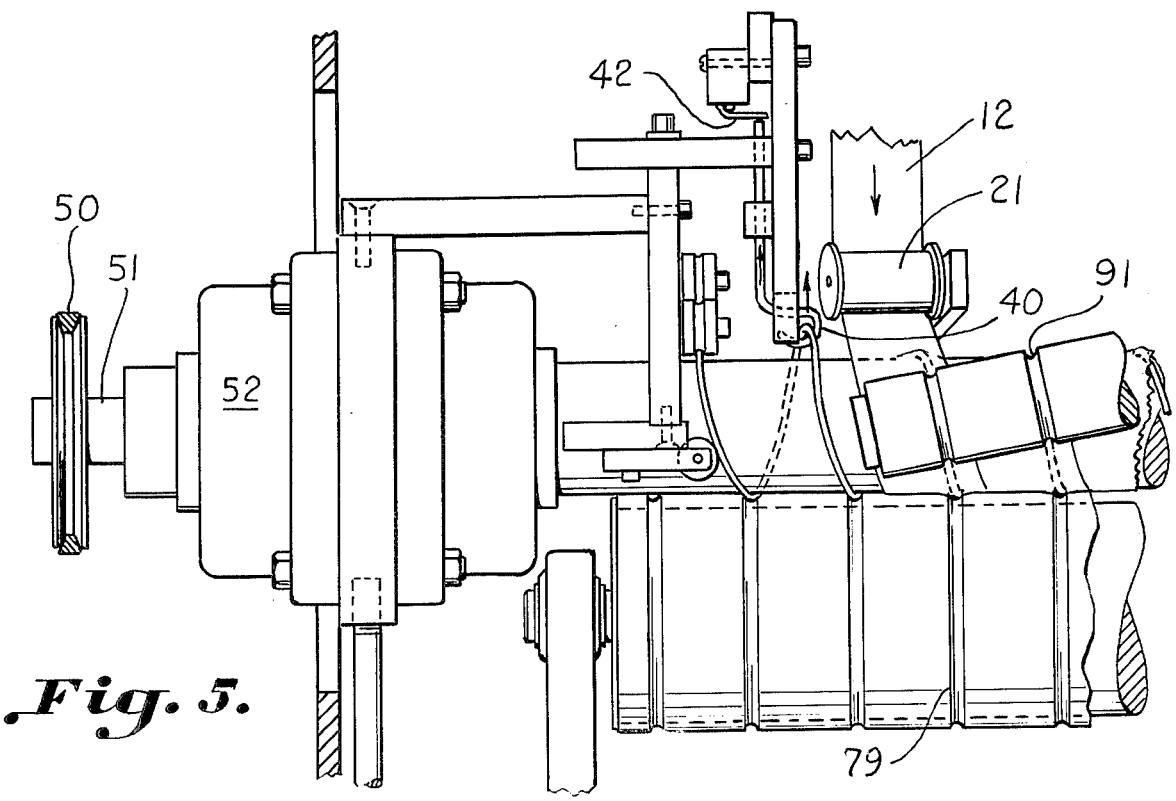
FIG. 5 is an enlarged fragmentary side sectional elevation taken along the line 5—5 of FIG. 3.

After leaving the pad 16 the tape 12 is directed under a guide roller 21, which is also adjustably mounted by one or more brackets 22 visible in FIGS. 1 and 5. The guide roller 21 is immediately adjacent to a tube forming station where the helical elements are initially brought together to form a product.

Figure 3:
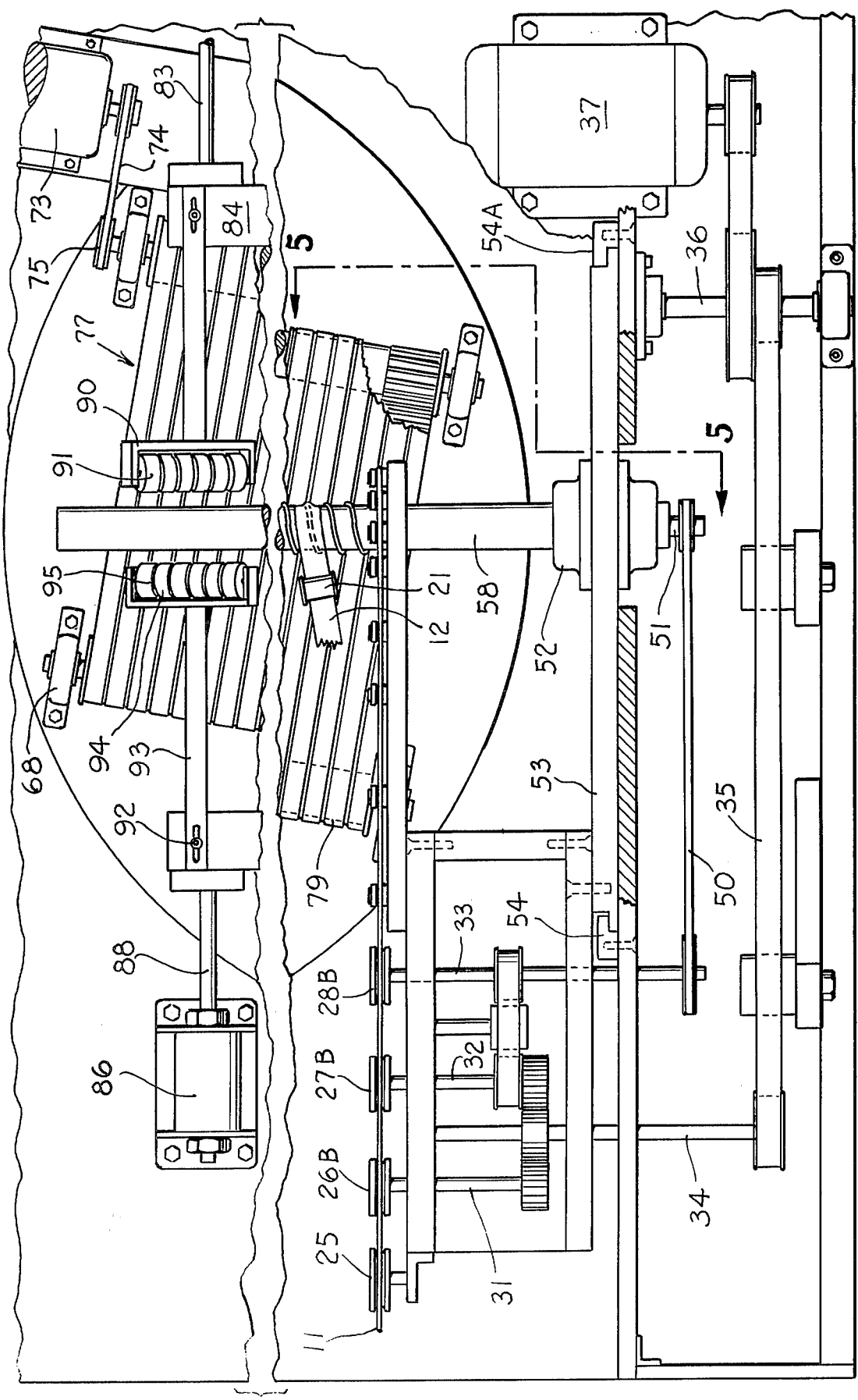
FIG. 3 is an enlarged fragmentary plan view partly in section of the apparatus of the invention.
Figure 4:
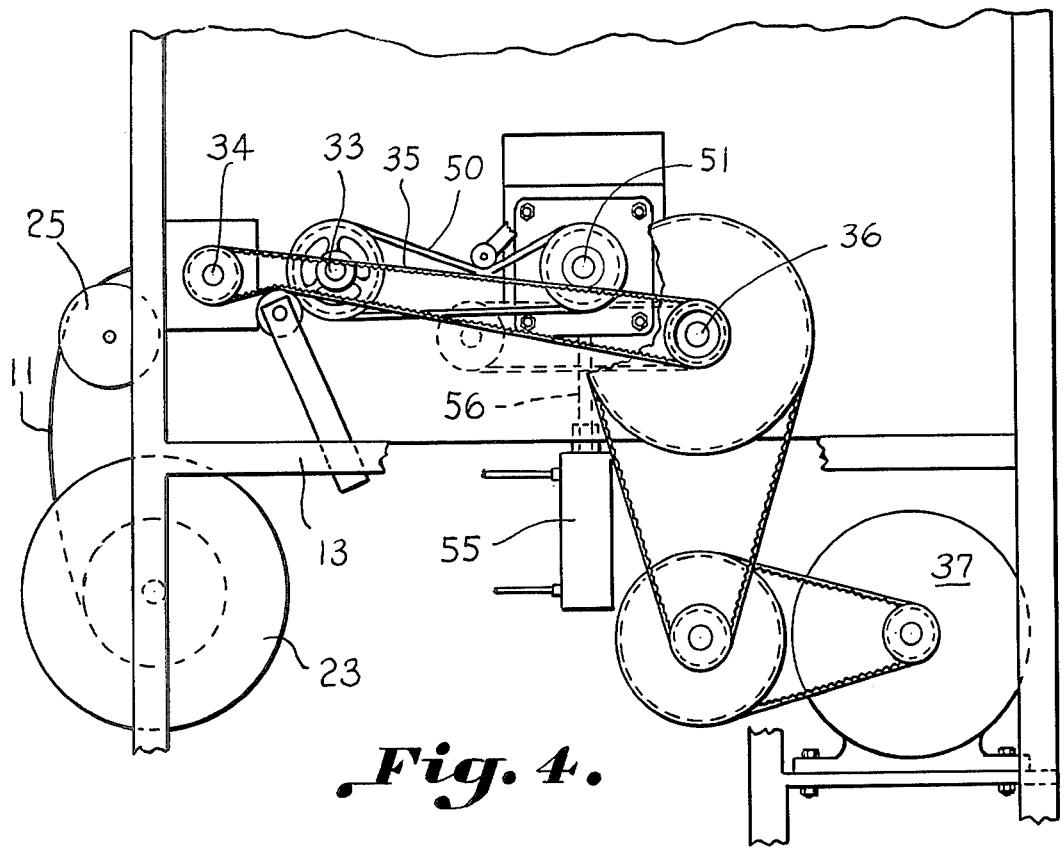
FIG. 4 is an enlarged fragmentary elevation of the rear of the apparatus shown in FIG. 3.

As shown in FIG. 4, a spool 23 is supported on the frame 13 and serves as a source for an indefinite length of the wire 11. The wire 11 is drawn from the spool 23 over a roller 25 by three opposed pairs of wire feed rolls 26A and B, 27A and B and 28A and B. Guide tubes 29 and 30 are located between the first and second pair of feed rolls 26A and B and 27A and B and the second and third pair of feed rolls 27A and B and 28A and B respectively. The lower rolls 26B, 27B and 28B in each pair are positively driven on respective shafts 31, 32 and 33 powered by gears and a belt as shown in FIG. 3 from a common shaft 34 which in turn is driven by a belt 35 driven from a jack shaft 36 and ultimately by a drive motor 37.

Figure 2:
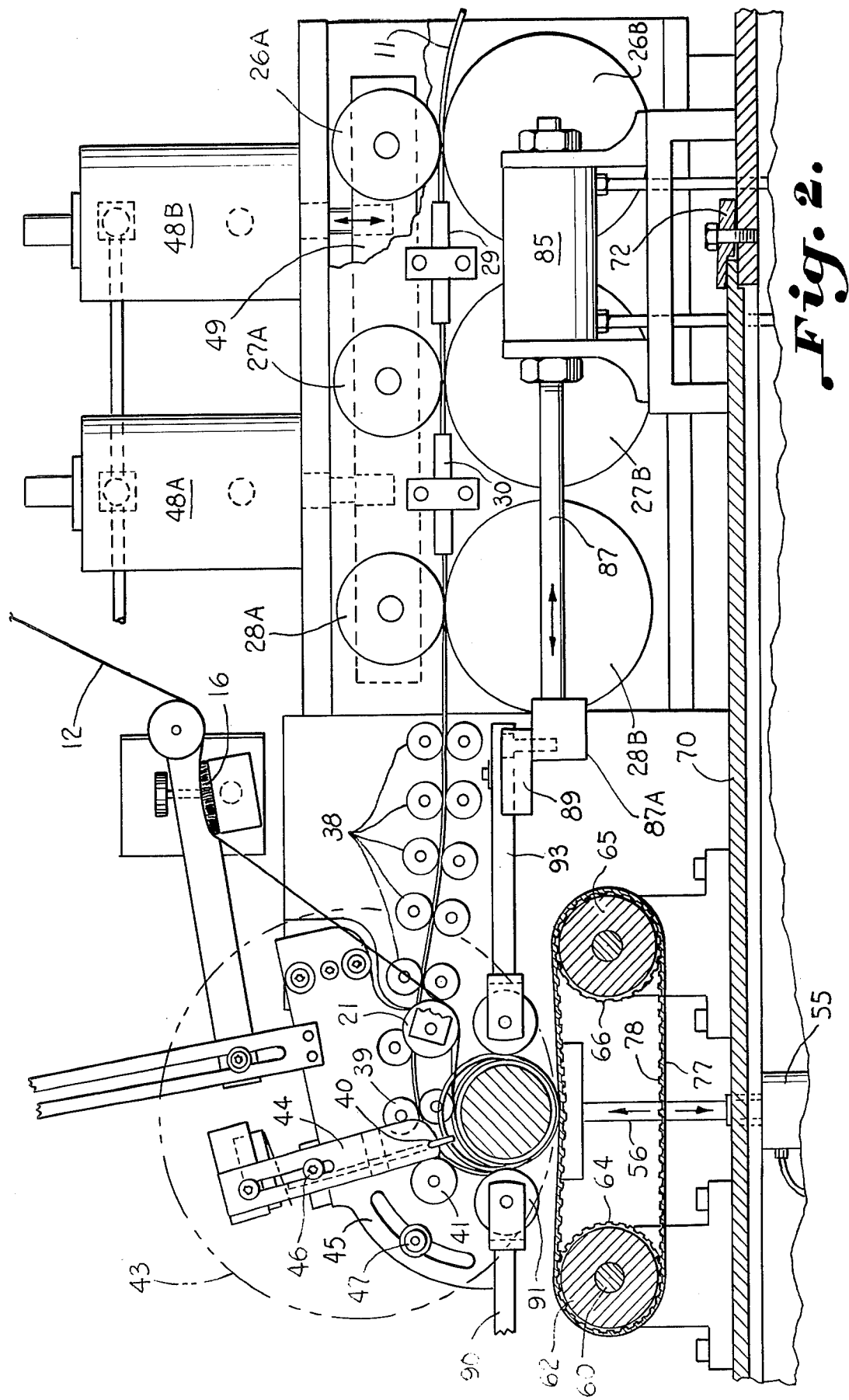
FIG. 2 is an enlarged fragmentary section taken along the line 2—2 of FIG. 1.

After leaving the drive rolls the wire 11 is guided through a series of pairs of secondary guide rolls 38 shown in FIG. 2 and finally through certain additional pairs of guide rolls 39 into a wire coiling station at which it is formed into a helix. A sensing wire loop 40 shown in FIGS. 2 and 5 receives the newly formed helix of the wire 11 and by suitable servo means well known in the art controls press rolls 41 in the coil forming station to maintain the helix of constant diameter. This sensing loop achieves its servo effect by moving into and out of engagement with a limit switch 42 shown in FIG. 5 in response to excessive diameters of the wire helix beyond that nominal diameter which is desired in the product. Considerable variation in the diameter of the product may be achieved even up to the diameter suggested by the dotted line circle 43 in FIG. 2, as a consequence of mounting the coil station on a bracket 44 which itself is given an additional degree of freedom by being mounted on a bracket 45. Set screws 46 and 47 permit these brackets to be fixed in the position desired for a given product diameter.

Air cylinders 48A and B act on a common bar 49 on which wire feed rolls 26A, 26B and 26C are mounted for applying and releasing pressure on the wire feed, and this control may also be made automatic in response to variations in the diameter of the wire helix.

In addition to carrying feed roll 28B the shaft 33 drives a belt 50 which in turn rotates a shaft 51 supported within a journal bearing 52 mounted on a movable plate 53. Opposed vertical edges of the plate 53 form tracks which slide within rails 54 and 54A fixed to the frame 13 of the apparatus. As shown in FIG. 4, an air cylinder 55 operates through a piston 56 to raise or lower the plate 53 so that the horizontal axis of the journal bearing 52 and shaft 51 can assume various elevational positions depending upon the diameter of the tube product.

The shaft 51 is an extension of a rotatable cylindrical mandrel 58 which is cantilevered horizontally across the path of movement of the wire 11. The mandrel 58 is also located such that the helix of the wire 11 is formed loosely about the outside surface of the mandrel. It is also located with respect to the guide roller 21 so that the tape 12 can readily be directed tangentially about the wire helix.

A shaft 60 mounted in a journal bearing 61 carries a drive roller 62 and a third journal bearing 63 supports the remote end of the shaft 36. The circumference of the drive roller 61 is formed with parallel drive teeth 64.

An idling roller 65 formed with teeth 66 is disposed parallel to drive roller 63 and is mounted in its own journal bearings 67 and 68. The four journal bearings 61, 63, 67 and 68 are all mounted on a turntable 70 as shown in FIG. 1 rotatably mounted on the frame 13 of the apparatus. The turntable 70 may rotate to various positions and be fixed therein by screw clamps 71 and 72 which register with index marks to permit measured changes in positions. Also supported by the turntable 70 is a variable speed drive motor 73 which by a belt 74 and pulley 75 drives the driving roller at its end adjacent to journal bearing 63.

The driving roller 64 and the idling roller 65 carry and are in positive engagement with a wide extended endless belt 77 which has teeth 78 on its inner surface adapted to mesh with the teeth 64 and 66 on the rollers 62 and 65. Semi-circular grooves 79 are formed in the belt parallel to its direction of travel and spaced apart a distance equal to the pitch of the wire helix in the finished product. The belt 71 is sufficiently wide so that there are more than a dozen such grooves. The upper run of the belt 77 passes immediately beneath and in resilient contact with the underside of the mandrel 58, and depending upon the diameter of the mandrel chosen the mandrel axis may be varied in position by the air cylinder 55 to vary the force exerted by the belt 77 on the mandrel. By mounting the rollers 62 and 65 and their drive motor 73 on the adjustable turntable 70, it is possible to dispose the line of travel of the belt 77 at an angle with respect to the axis of the mandrel 58 equal to the lead angle of the wire helix of the product.

A pair of air cylinders 80 and 81 are mounted on the frame and their respective pistons 82 and 83 are joined by connecting blocks 82A and 83A to a cross bar 84 disposed alongside the mandrel 58. On the other side of the mandrel 58 are two additional air cylinders 85 and 86 having pistons 87 and 88 joined by connecting blocks 87A and 88A to a bar 89 which is generally parallel to the bar 84. The bar 84 carries five yokes 90 each of which at its outer end rotatably supports a grooved roller 91 which is angled in a vertical plane for reasons described hereinafter. Each yolk 90 is adjustably mounted by a screw 92 in a slot as shown in FIG. 3 to permit its roller 91 to be moved toward and away fom the mandrel 58 for fine adjustment of that relative position. Similar yokes 93 and rollers 94 are adjustably supported on the bar 89 and are paired with the five supported on the bar 90 so that the angled rollers are also paired. Each of the ten rollers 91 and 94 is formed with five semi-circular circumferential grooves 95 spaced apart a distance equal to the pitch of the helix in the tube product.

The connecting blocks 82A, 83A, 87A and 88A are oblong and may be fixed in the horizontal position shown so that the rollers 91 and 94 are relatively low for a smaller diameter product or they may be turned a quarter turn into a vertical position so that the rollers 91 and 94 are relatively high for a larger diameter product.

The method of the invention as embodied in the operation of this apparatus is intended to produce a continuous length of flexible tubing fabricated of a helix of wire with an overlapping helically wrapped tape. Such a product has a certain outside diameter established by the helix of the wire and has a certain pitch or lead determined by the distance between adjoining convolutions of the wire helix. As can be readily understood this pitch in relation to the product diameter can also be expressed as a lead angle, which is to say the acute angle defined by the center line of the product and the straight line disposed tangent to the helix. Certain portions of the apparatus described hereinbefore are chosen in their dimensions or position in accordance with these variables in the finished product. For example the grooves 79 in the belt are spaced like the grooves in the rollers 91 and 94 according to the pitch of the helix in the product. The endless belt 77 is at an angle to the axis of the mandrel 58 as shown in FIG. 3 equal to the lead angle of the wire of the finished product. Similarly the grooved rollers 91 are angled with respect to the mandrel at that same lead angle. The rollers 91 are withdrawn away from or moved toward the mandrel 58 by the air cylinders 80, 81, 85 and 86 depending upon the diameter of the finished product. Finally the mandrel 58 itself is moved up or down by the air cylinder 55 depending upon the size of the mandrel and the diameter of the finished product. Having established the foregoing parameters it is also necessary to adjust the position of the wire forming rollers and the tape glue pad 16 by appropriate change in the settings of the adjustable brackets 18 and 19 and 44 and 45.

Assuming a selection of these different variables the operation of the machine is as follows: The wire 11 is passed around its feed rolls and directed around the wire coiling station at which it is formed into a helix of the desired diameter about the mandrel 58. The wire passes between the nip or pressure contact area where the mandrel 58 engages the endless belt 77 and its successive helices are fitted within the grooves 79 in the surface of the belt 77. The wire helix is formed loosely about the mandrel 58 and within its first four or five convolutions it receives the tape 12 guided from the roller 21 with glue already applied to one surface of the tape. The width of the tape is such that it spans successive convolutions of the wire and the overlapping edges of the tape convoltuions are adhered together to form a continuous tube wall. A substantial portion of the initially formed length of this product (e.g. more than a dozen helix convolutions) is engaged by the wide belt 77 with the direction of belt travel in line with the helix angle of the product to insure that the turns of the wire are gripped directly and smoothly by the grooved belt. In like manner the vertically tilted rollers 91 and 94 loosely contain the outside surface of the newly formed tubular product again with a matching tangential relation between the grooves of the rollers and the turns of the wire helix.

It is to be understood that this method and apparatus is capable of producing variable pitch products with any number of helically fabricated elements, not just simply a single wire and a single tape. It is desirable not to synchronize the speed of the belt 77 with the drive of the mandrel 58 but rather to advance the mandrel surface slightly faster than that of the belt surface. It wll also be recognized that the finished tube is held rather loosely between the pairs of rollers 91 and 94 and that the middle groove on each angled roller engages the tube more firmly than the grooves at the outer ends of the rollers. In all cases there is at least one-quarter inch clearance between the outside surface of the mandrel 58 and the inside of the tube formed thereon.

I claim:
1. A method of making flexible tubing of at least one wire helix of a certain pitch and lead angle covered by helically wrapped tape which comprises:
   (a) axially rotating a cylindrical mandrel surface,
   (b) passing one run of a belt of a width a plurality of times the wire helix pitch and having a plurality of grooves extending in the direction of belt travel between belt-driving rollers resiliently against only a portion of the circumference of the mandrel surface at an angle to the rotation axis of the mandrel surface equal to the helix lead angle,
   (c) drawing the wire helix loosely about the mandrel and between the mandrel and the run of the belt,
   (d) drawing the tape between the mandrel and the run of the belt so that the tape is wrapped about the helix with overlapping turns, and
   (e) adhering together the overlapping turns of the tape.

2. Apparatus for continuously forming flexible tubing of at least one wire helix of a certain pitch and lead angle covered by helically wrapped tape comprising:
   (a) a mandrel rotatable about a longitudinal axis,
   (b) a pair of belt-driving rollers each having a length a plurality of times the pitch of the helix, one of which is a driving roller and the other of which is an idling roller,
   (c) an endless belt of a width a plurality of times the pitch of the helix and having a plurality of parallel grooves extending in the direction of the belt travel and spaced apart equal to the helix pitch,
   (d) one run of said belt passing around and being positively driven by the belt-driving rollers and passing in resilient contact with only a portion of the circumference of the mandrel at an angle to the mandrel axis equal to the helix lead angle,
   (e) supplies of said wire and said tape,
   (f) wire forming means for forming loosely about the mandrel the wire helix which is drawn between the mandrel and the belt grooves,
   (g) tape guiding and adhering means for wrapping the tape about the wire helix with joined tape convolutions adhered together, and
   (h) opposed pairs of guide rollers engaging the tape wrapped wire helix on opposite sides thereof and being vertically tilted at the helix lead angle to engage the helix tangentially.

* * * * *